(12) United States Patent
Gordon et al.

(10) Patent No.: US 7,743,320 B1
(45) Date of Patent: *Jun. 22, 2010

(54) METHOD AND SYSTEM FOR DETERMINING PAGE NUMBERS OF PAGE IMAGES

(75) Inventors: Charles Gordon, Seattle, WA (US); Hilliard B. Siegel, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 851 days.

This patent is subject to a terminal disclaimer.

(21) Appl. No.: 11/615,737

(22) Filed: Dec. 22, 2006

Related U.S. Application Data (63) Continuation of application No. 10/873,729, filed on Jun. 22, 2004, now Pat. No. 7,210,102.

(51) Int. Cl.
*G06F 17/24* (2006.01)
*G06F 17/15* (2006.01)

(52) U.S. Cl. .................. 715/230; 715/231; 715/232; 715/253; 715/273

(58) Field of Classification Search ......... 715/230–232, 715/253, 273
See application file for complete search history.

(56) References Cited

U.S. PATENT DOCUMENTS

| | | | |
|---|---|---|---|
| 5,185,821 A | 2/1993 | Yoda | |
| 5,384,785 A * | 1/1995 | Yoda | 714/746 |
| 5,422,743 A * | 6/1995 | Farrell et al. | 358/537 |
| 5,434,932 A | 7/1995 | Scott | |
| 5,535,313 A | 7/1996 | Schwab | |
| 5,680,198 A | 10/1997 | Ohnishi | |
| 5,970,483 A | 10/1999 | Evans | |
| 5,987,448 A | 11/1999 | Evans | |
| 6,049,861 A | 4/2000 | Bird | |
| 6,055,530 A | 4/2000 | Sato | |
| 6,226,631 B1 | 5/2001 | Evans | |
| 6,363,179 B1 | 3/2002 | Evans | |
| 6,453,079 B1 | 9/2002 | McInerny | |
| 6,532,461 B2 | 3/2003 | Evans | |
| 7,199,907 B2 * | 4/2007 | Shimizu | 358/448 |
| 2002/0138508 A1 | 9/2002 | Wiechers | |
| 2003/0133156 A1 | 7/2003 | Cragun | |
| 2004/0119998 A1 | 6/2004 | Xiong | |
| 2004/0199875 A1 | 10/2004 | Samson | |
| 2005/0238205 A1 | 10/2005 | Kimura | |

\* cited by examiner

*Primary Examiner*—Stephen S Hong
*Assistant Examiner*—Wilson Tsui
(74) *Attorney, Agent, or Firm*—Christensen O'Connor Johnson Kindness PLLC (57) ABSTRACT

Page numbering of images of pages in a document includes extracting all numbers that are exactly one different than a number found on an adjacent page, and grouping the extracted numbers into a set of sequences that describe the candidate page numbers in the book. The sequences most likely to contain candidates that represent the actual page numbers are determined by merging the most reliable sequences together to bridge gaps between the sequences, and identifying those gaps where the page numbers have been intentionally omitted. Page images are labeled with numbers that are determined to be most likely to represent the actual page number. Page numbering is abandoned when insufficient numbers of pages numbers are able to be extracted or assigned relative to the total number of pages in the document.

35 Claims, 9 Drawing Sheets

| SEQUENCE 609 | NEIGHBOR 624 | GAP 606 | NUMBER ASSIGNMENT 626 |
|---|---|---|---|
| 616 ⟩ 5,6,7,8 | 612 ⟩ 1,2,3 | 606B ⟩ GAP B 3 PGS. | UNMATCHED GAP  1≠3 NO ASSIGNMENT |
| 616 ⟩ 5,6,7,8 | 620 ⟩ 10,11 | 606C ⟩ GAP C 1 PG. | MATCHED GAP  1=1 $9_A$ ASSIGNED DISCARD OVERLAPPING SEQUENCE 44,45 |
| 622 ⟩ 5,6,7,8,9,10,11 | 614 ⟩ 81,82 | 606A ⟩ GAP A 1 PG. | UNMATCHED GAP  -76≠1 NO ASSIGNMENT |
| 612 ⟩ 1,2,3 | 5,6,7,8,9,10,11 622 | 606B ⟩ GAP B 3 PGS. | INSERT IDENTIFIED $3.1_{I_A}, 3.2_{I_A}, 4_A$ (OR $4_A, 4.1_{I_A}, 4.2_{I_A}$) ASSIGNED DISCARD OVERLAPPING SEQUENCE 81,82 |
| 612 ⟩ 1,2,3 | NONE | 606D ⟩ GAP D 1 PG. | INSERT ASSUMED $0.1_{I_A}$ ASSIGNED |

METHOD AND SYSTEM FOR DETERMINING PAGE NUMBERS OF PAGE IMAGES

CROSS-REFERENCE TO RELATED APPLICATION

This application is a continuation of prior application Ser. No. 10/873,729, filed Jun. 22, 2004, which is herein incorporated by reference.

FIELD OF THE INVENTION

The present invention is directed to processing of digital images, and more particularly to processing images of pages of content.

BACKGROUND

As the use of computers and computer-based networks continues to expand, content providers are preparing and distributing more and more content in electronic form. This content includes traditional media such as books, magazines, newspapers, newsletters, manuals, guides, references, articles, reports, documents, etc., that exist in print, as well as electronic media in which the aforesaid content exists in digital form or is transformed from print into digital form through the use of a scanning device. The Internet, in particular, has facilitated the wider publication of digital content through downloading and display of images of content. As data transmission speeds increase, more and more images of pages of content are becoming available online. A page image allows a reader to see the page of content as it would appear in print. Furthermore, graphics, such as charts, drawings, pictures, etc., and the layout of such graphics in a page, are not lost when the page of content is provided as a digital image.

Despite the great appeal of providing digital images of content, many content providers face challenges when generating and storing the images of content, particularly when the accuracy of recognizing text in the content is important. For example, to enable users to perform text searches of the content of page images, the images must be translated into computer-readable text using one or more character recognition techniques, such as optical character recognition (which includes digital character recognition). Although the accuracy of optical character recognition is generally quite high, recognition of page numbers presents particular challenges that are difficult to overcome. For example, page numbers often appear in different locations on different pages, as is typically the case when the numbers appear in the right- and left-most corners of the front and back of a double-sided page in a book. In some cases, the page numbering scheme may be different for different portions of a book, such as the table of contents, index, or epilogue. In yet other cases, pages are intentionally left unnumbered, such as for inserts of graphics, advertisements, or other content. When scanning large volumes of pages, the cost of hand assigning each page image with a page number that is the same as the actual page number is extremely high and is, therefore, not a practical solution.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

To address the above-described problems and other shortcomings in the prior art, the present invention provides a method that can be implemented in a computer to process pages of content that have been scanned or otherwise transformed into digital images to determine what page number, if any, to assign to each image. The assigned page number is preferably the actual page number of the corresponding printed page. In one aspect, the present invention provides a method that includes capturing or otherwise obtaining an image of each page of a book (or other document or work containing multiple pages) in the order in which the page appears relative to the other pages in the book. The method further includes extracting numbers from the image that may be considered as candidates for the actual page number of the page. One criteria for being considered as a candidate page number is whether the number is exactly one greater or lesser than a number extracted from a preceding or succeeding page, i.e. whether the number is a consecutive to a candidate number extracted from an adjacent page.

In one aspect, extracting numbers from the page images depends on the format in which the content of the page image is represented. When the content is represented in a text-accessible format, the numbers may be extracted directly from the text. However, when the content is represented in a non-text-accessible format, the numbers may be extracted with the use of a character recognition process applied to the page image that can recognize the available numbers.

In one aspect, the method further includes grouping the candidate numbers into sequences. When more than one candidate number per page is extracted, the candidate numbers may be grouped into multiple overlapping sequences. Gaps may also exist between different sequences. The gaps represent page images for which no candidate page numbers were extracted. Gaps occur for various reasons, including those situations in which the page content is represented in a non-text-accessible format, and the character recognition process that was applied to the page image either did not recognize any numbers on the page, or recognized several numbers, none of which met the criteria for a candidate page number (e.g., because none of the numbers were exactly one greater than a number extracted from the previous page). In some cases, gaps may represent pages in which page numbers have been intentionally omitted, such as inserted pages that typically contain mostly non-textual material, such as photographs, figures, and other graphical content, including advertising.

In another aspect, the method further includes determining which sequences of candidate numbers are more likely to be reliable, i.e. to represent actual page numbers, and merging the more reliable sequences with neighboring sequences of page numbers in an attempt to eliminate any gaps between them. Since longer sequences of candidate numbers are assumed more reliable, the method further includes sorting the sequences in order, from longest to shortest, so that the longest sequences can be identified and merged first.

In yet another aspect, criteria other than the length of a sequence may be used to determine which sequences are more reliable. For example, a page type may be provided to indicate whether the page is part of the body of the document from which it was obtained, or whether the page is an index page, table of contents page, prologue, epilogue, etc. In certain cases, the page numbers of pages near the beginning and/or end of the book, such as the table of contents or the index page, may have been provided manually as part of the image-capturing process. The page type may function as an anchor point that aids in determining whether a sequence that includes a candidate number for that page or an adjacent page is more likely to represent actual page numbers, i.e. the sequence is more reliable than another sequence, thereby justifying merging the sequence before merging other sequences not associated with a reliable page type indicator.

In another aspect, the merging process may include comparing a sequence to a neighboring sequence and determining the difference between the closest extracted number in one sequence with the closest extracted number in the other sequence. The closest extracted numbers are those appearing at the right- or left-most ends of a sequence, depending on whether the sequence appears before or after the neighboring sequence to which it is being compared. When the comparison reveals that the extracted numbers at the end of one sequence and the beginning of the next are different by exactly the number of page images in the gap between the compared sequences, it is likely that the gap is comprised of page images where the character recognition process did not accurately recognize the page number. Accordingly, the merging process assigns the missing page numbers to the page images in the gap. Having bridged the gap, the merging process joins the two compared sequences into one longer sequence. The merging process may continue with the next longest sequence or next most reliable sequence until no further merging can occur.

In a further aspect, the method may include examining the remaining gaps (if any) between sequences to identify possible inserts in the book where page numbers have been intentionally omitted. Identifying possible inserts may include comparing the closest extracted numbers of the sequences surrounding a remaining gap as was earlier described for the merging process. Inserts are identified when the comparison reveals that the extracted numbers at the end of one sequence and the beginning of the next are different by a substantially small number, usually just one or two pages, regardless of the size of the gap, i.e., regardless of the number of pages comprising the insert. When an insert is identified, the method may include assigning numbers to one or more of the page images in the gap, and joining the two compared sequences into one longer sequence.

In yet another aspect, the method may further include assigning page numbers to any remaining pages where no extracted numbers have been found or assigned through the merging and insert identification processes described above. Before assigning page numbers to remaining page images, the method may first determine whether the assignments made thus far meet a completion threshold, and abandon page numbering if the threshold has not been met. For example, when the number of pages for which no page numbers have been extracted or assigned through the merging and insert identification processes exceeds a certain percent of the total number of pages in the book, the page numbering may then be abandoned.

In a still further aspect, a varying threshold for determining the completion of page numbering may be used in the invention. The amount of the threshold, e.g., the percent of the total number of pages for which no page numbers have been extracted or assigned, may vary depending on, among other factors, the type of book, the quality of the images, and the character recognition technology that is being employed to extract the candidate numbers from the pages. In some cases, the threshold may be expressed in terms of a minimum number of pages for which page numbers have been extracted or assigned irrespective of the total number of pages in the book from which the pages were obtained.

Further embodiments of the invention described herein provide a computer-implemented system for automated page numbering of images of pages of a book based on comparing sequences of candidate page numbers extracted from the page images, and assigning page numbers using methods as described above.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention is directed to a method and system that determines what page numbers, if any, to assign to images of pages of content from a book or other document in which pages appear in an order. Briefly stated, page numbers are determined by comparing sequences of extracted numbers that represent candidate page numbers recognized from the page images, determining which of those sequences are most reliable, i.e. most likely to contain page numbers that accurately represent actual page numbers, and assigning missing page numbers to page images occurring in gaps that may exist between the sequences. The following detailed description provides exemplary implementations of the invention. Although specific flow diagrams and system configurations are illustrated, it should be understood that the examples provided are not exhaustive and do not limit the invention to the precise forms disclosed. Persons having ordinary skill in the field of computers and digital imaging will recognize process steps described herein that may be interchangeable with other steps, or combinations of steps, and still achieve the benefits and advantages of the present invention.

Figure 1:
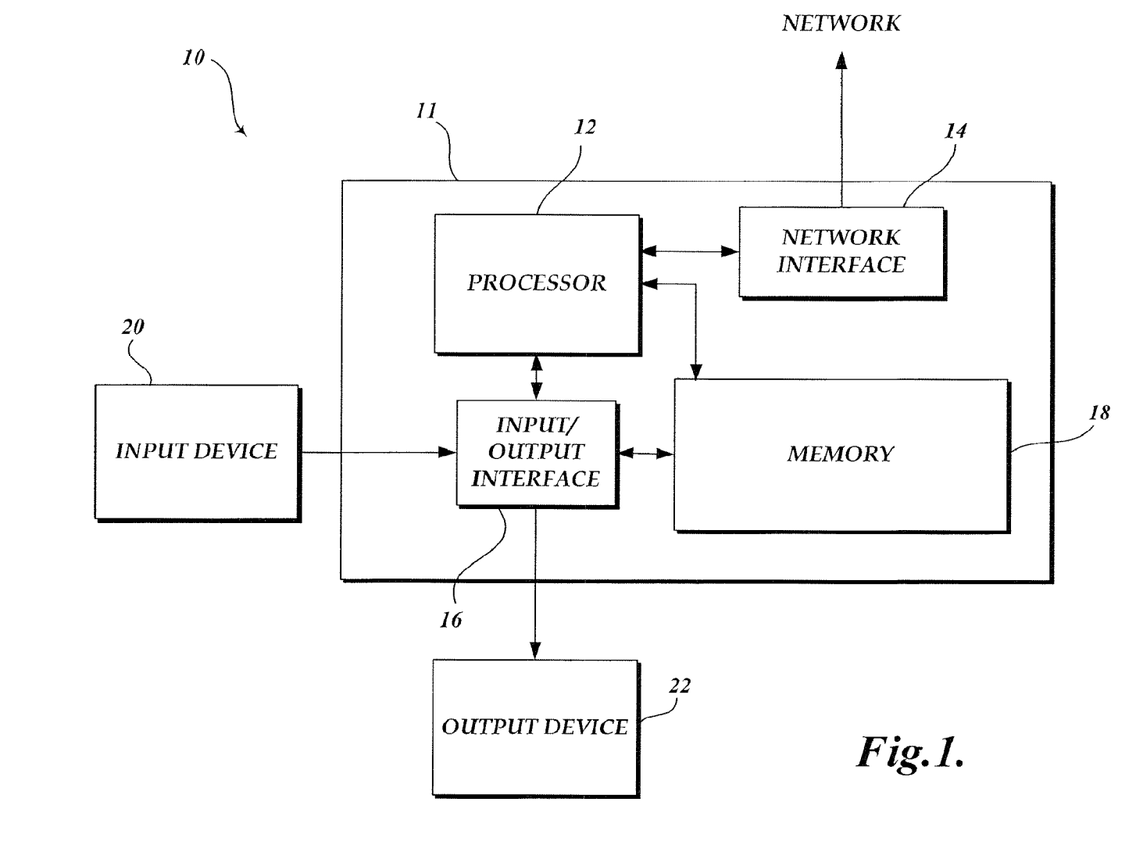
FIG. 1 is a functional block diagram of an exemplary computing system that may be used to implement an embodiment of the present invention.

To provide a context for describing embodiments of the present invention, FIG. 1 illustrates a functional block diagram of a computing system 10 that may be used to implement the present invention. The computing system 10 includes a computing device 11 having a processor 12 in communication with a variety of computing elements, including a network interface 14, an input/output interface 16, and a memory 18. The network interface 14 enables the computing device 11 to communicate data, control signals, data requests, and other information via a computer network (LAN, WAN, Internet, etc.). For instance, the computing device 11 may receive a file containing digital images of content from a computer network via the network interface 14.

The input/output interface 16 enables the computing device 11 to communicate with various local input and output devices. An input device 20 in communication with the input/output interface 16 may include computing elements that provide input signals to the computing device 11, such as a digital camera, a scanner, a keyboard, mouse, external memory, disk drive, etc. Input devices comprising cameras and scanners, for example, may be used to provide digital images of content to the computing device 11 for processing and page numbering in accordance with the present invention.

An output device 22 in communication with the input/output interface 16 may include typical output devices, such as a computer display (e.g., CRT or LCD screen), a television, printer, facsimile machine, copy machine, etc. As to the present invention, the output device 22 may be used to display images with page numbers that the computing device 11 has determined to be accurate.

The processor 12 is configured to operate in accordance with computer program instructions stored in a memory, such as the memory 18. Program instructions may also be embodied in a hardware format, such as a programmed digital signal processor. Furthermore, the memory 18 may be configured to store digital images of content for processing, transmission, and display in accordance with the present invention. Those having ordinary skill in the art of computers will recognize a wide selection of commercially-available components that can be used to construct a system such as the computing system 10 illustrated in FIG. 1.

Figure 2:
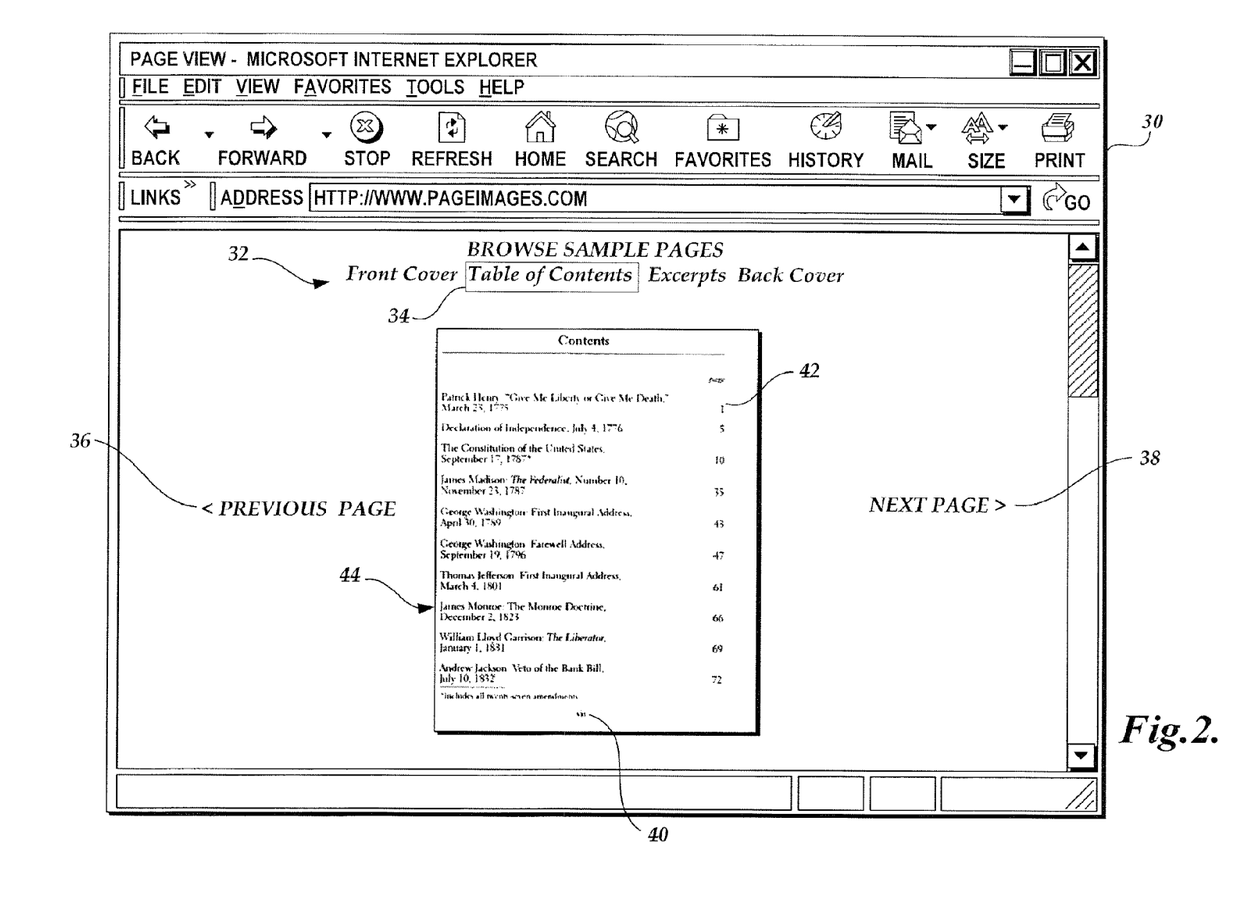
FIG. 2 is a pictorial view of a browser program depicting a Web page in which a digital image of a page of content is displayed.
Figure 3:
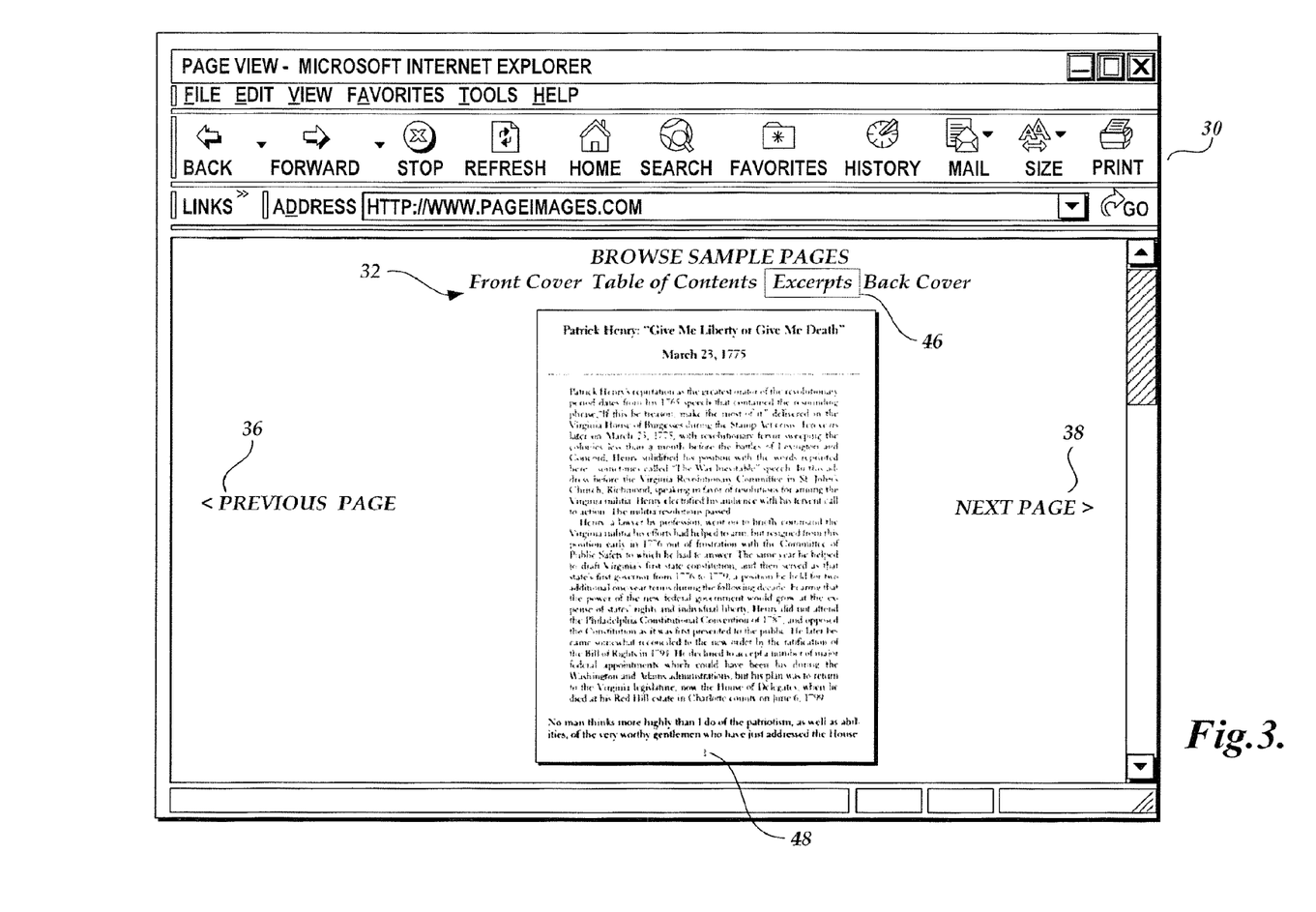
FIG. 3 is a pictorial view of a browser program depicting a Web page in which a digital image of another page of content is displayed.
Figure 4:
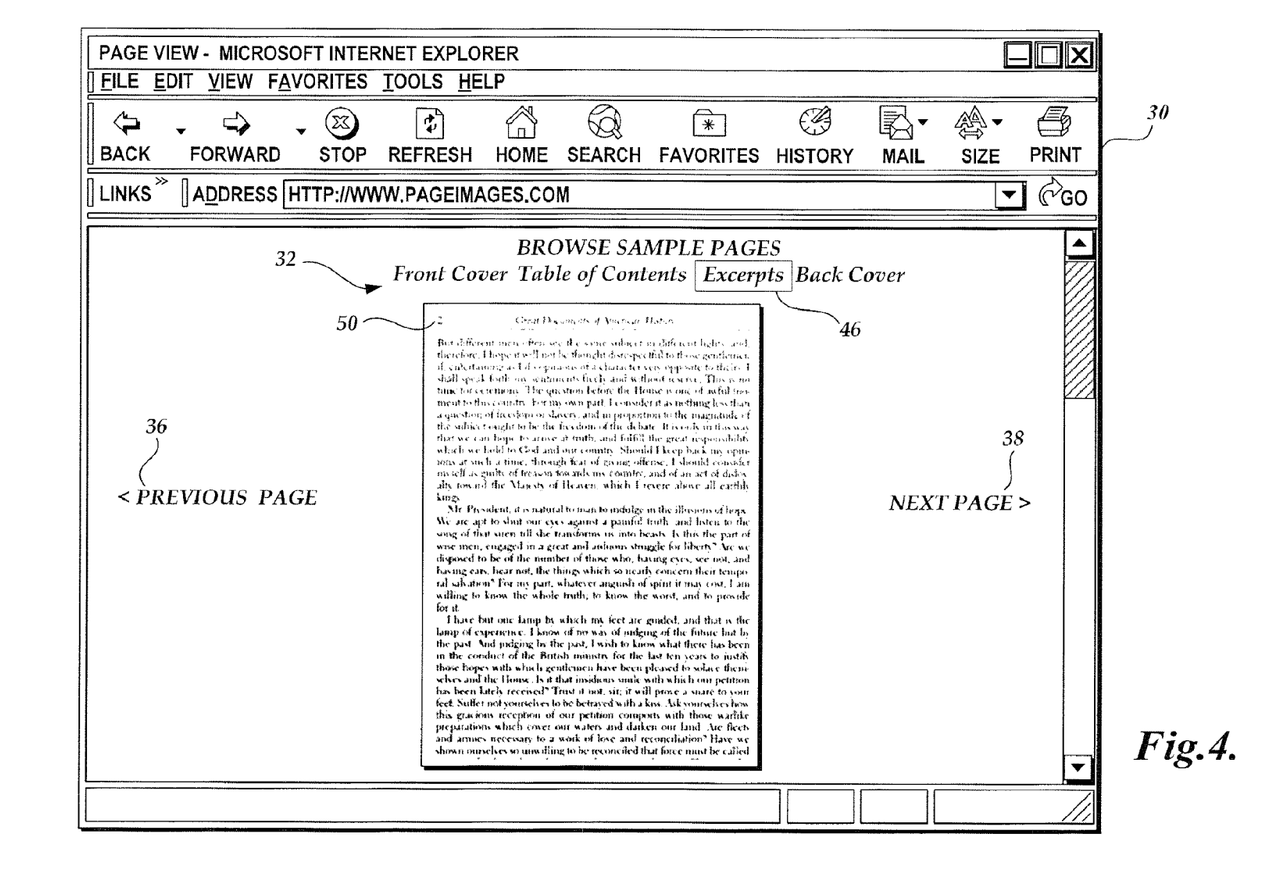
FIG. 4 is a pictorial view of a browser program depicting a Web page in which a digital image of yet another page of content is displayed.

FIGS. 2-4 illustrate a Web environment in which the present invention may be implemented. Content providers may distribute digital images of content over the Internet for display by remote computing devices. For example, FIG. 2 illustrates the display of a computing device that is operating a browser program 30. At the top of the browser display are various selectable controls 32 for navigating the images, e.g., "Front Cover," "Table of Contents," "Excerpts," and "Back Cover." Depicted underneath the controls 32 is a digital image of content 42. The Web page may include additional controls, "Previous Page" 36 and "Next Page" 38 for browsing through the pages of content 42 being displayed.

For the sake of illustration, FIG. 2 depicts a Table of Contents page from a book, as indicated by the selected control "Table of Contents" 34. As shown, the Table of Contents page contains a page number "vii" 40, as well as several other numbers, some of the numbers representing page numbers corresponding to the locations of the specified content in the book, and some of the numbers representing dates in the textual content, e.g., "James Monroe: The Monroe Doctrine, Dec. 2, 1823," as indicated at reference numeral 44. Although it is apparent to the human reader that the page number is "vii" 40, when attempting to automate the process, there are many numbers on the page that could be considered to be the page number. For example, when performing character recognition on such a page, any number recognized on the page could be considered a candidate for the actual page number. As will be seen herein, when one or more candidate page numbers are present, methods of the present invention are able to identify and assign the actual page number to the image of the page.

FIG. 3 depicts another page image 48 in the display of the browser program 30 of FIG. 2. Unlike the image of the Table of Contents page depicted in FIG. 2, this is an image of a page of content selected by the "Excerpts" control 46. However, like the Table of Contents page image depicted in FIG. 2, this image also presents many candidate page numbers that could be considered to be the page number (although it, too, is apparent to a human reader that the page number is the "1" that appears at the bottom center of the page 48).

FIG. 4 depicts another page image 50 that is shown in the display of the browser program 30 of FIG. 2. The depicted page image 50 is another image of a page of content from the same book illustrated in FIGS. 2 and 3 showing that the candidate page numbers might appear in different locations on a page, even within the same book, in this case the upper left corner of the page. Methods of the present invention are able to identify and assign page numbers to page images even when the location of the page number varies from one page to the next.

As illustrated by the foregoing, multiple candidate page numbers may be extracted from a given page, or perhaps no candidate numbers at all. In some cases, the page numbers may be intentionally omitted, or the pages may be numbered using different numbering scheme in one section of the book versus another section of the same book. Accordingly, embodiments of the invention described herein are configured to determine which of the available candidate numbers in a page image represent the actual page number, and if no candidate number is available, which number, if any, should be assigned to accurately represent the page number. In one embodiment, if a threshold number of page numbers in a given book have not been assigned, or cannot be assigned with a reasonable degree of accuracy, then further attempts to determine and assign page numbers are abandoned.

It should also be understood that, in the context of the present invention, the terms "text" and "character" include all forms of letters, characters, symbols, numbers, formulas, etc., that may be used to represent information in a page image. The term "page" broadly refers to any space of two dimensions or greater in which text may reside. The term "character recognition" refers to all forms of optical character recognition, or OCR (using optical techniques such as minors and lenses) and digital character recognition (using scanners and computer algorithms). Since very few applications remain that use true optical techniques, the term OCR as used herein includes all forms of digital character recognition as well.

Figure 5:
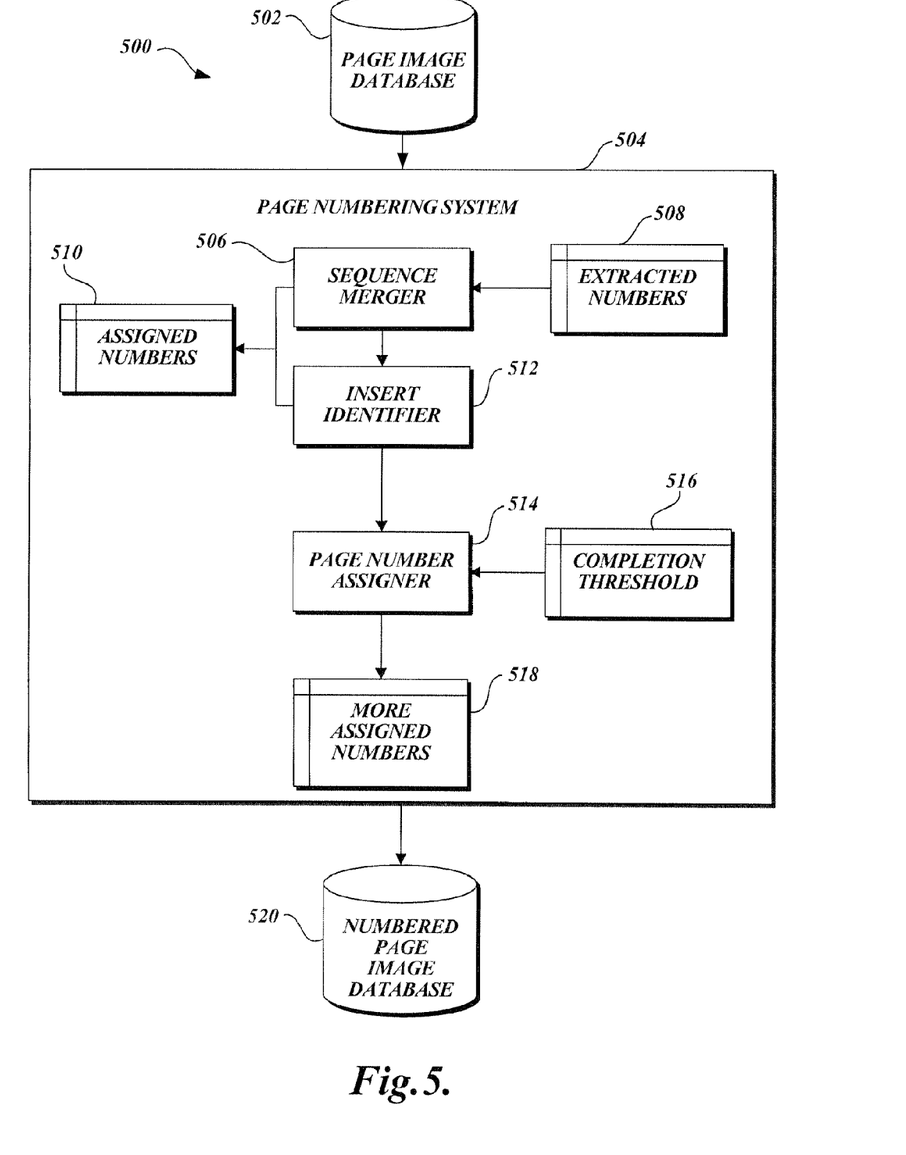
FIG. 5 depicts an exemplary arrangement of components of a page numbering system formed in accordance with an embodiment of the present invention.

Before discussing the details of an exemplary method and scenario of page image numbering according to the invention, it is helpful to first discuss a page numbering system that may be used to carry out the method. FIG. 5 depicts an exemplary arrangement 500 of some components of a page numbering system 504 formed in accordance with an embodiment of the present invention. As shown, a page image database 502 contains images of pages of a book or other document having multiple ordered pages. The format of the page images may vary, and can include page images in which the content of the page image is represented in a text-accessible format, such as in an Adobe Portable Document File (PDF), or in which the content of the page image is represented in a non-text accessible format, such as in a JPEG file. At least some of the page images contain numbers that may be extracted from the image as candidates for the actual page number of the page as it appears in the printed book or document from which the page was obtained. When the content of the page image is represented in a non-text-accessible format, the page image may be processed with OCR or other character recognition techniques to make available all numbers that can be extracted as candidates for the actual page number. The page image database 502 is shown in communication with the page numbering system 504.

In one embodiment, the page numbering system 504 comprises, among other components, a sequence merger component 506, an insert identifier component 512, and a page number assigner 514. The system 504 further comprises data structures representing various data, including extracted page numbers 508, assigned page numbers 510, 518, and a completion threshold 516. The page numbering system 504 preferably extracts all available numbers on a page image that meet the criteria for possibly representing the actual page number of the page. In other words, the page numbering system 504 preferably extracts all candidate page numbers. In one embodiment, a number is considered to be a candidate page number if it is exactly one greater than a number found on a preceding page image. If a candidate page number is found, the number found on the preceding page (that is one less) is also considered a candidate page number. The extracted candidate page numbers 508 are then grouped into sequences that may or may not represent sequences of actual page numbers in the book.

Briefly stated, in one embodiment, the sequences of extracted candidate page numbers 508 are processed by the sequence merger component 506 to merge the sequences where possible by assigning page numbers to page images in the gaps between the sequences. In one embodiment, the sequences of extracted candidate page numbers 508 are also processed by the insert identifier component 512 to further merge the sequences where possible to account for any inserted pages for which page numbers appear to have been intentionally omitted. A page number assigner component 514 continues processing the merged sequences to determine whether any page numbers still unaccounted for may be assigned to page images with a reasonable degree of accuracy as determined by consulting the completion threshold 516. In one embodiment, the completion threshold 516 is a pre-defined number that represents a minimum number of pages, or a certain percent of the total number of pages in a book, for which page numbers have been determined through extracting and merging, and below which further attempts to automatically determine and assign page numbers are abandoned.

In one embodiment, the output of the page numbering system 504 is a numbered page image database 520 that contains the same images that were contained in the page image database 502, but with page numbers associated with each image in accordance with an embodiment of the present invention. The numbered page image database 520 may be accessed by a browser program 30 as described above, including a program 30 with text and page searching capabilities that enhance the page image displayed in the browser 30 by including the determined page number associated with the image.

Figure 6A:
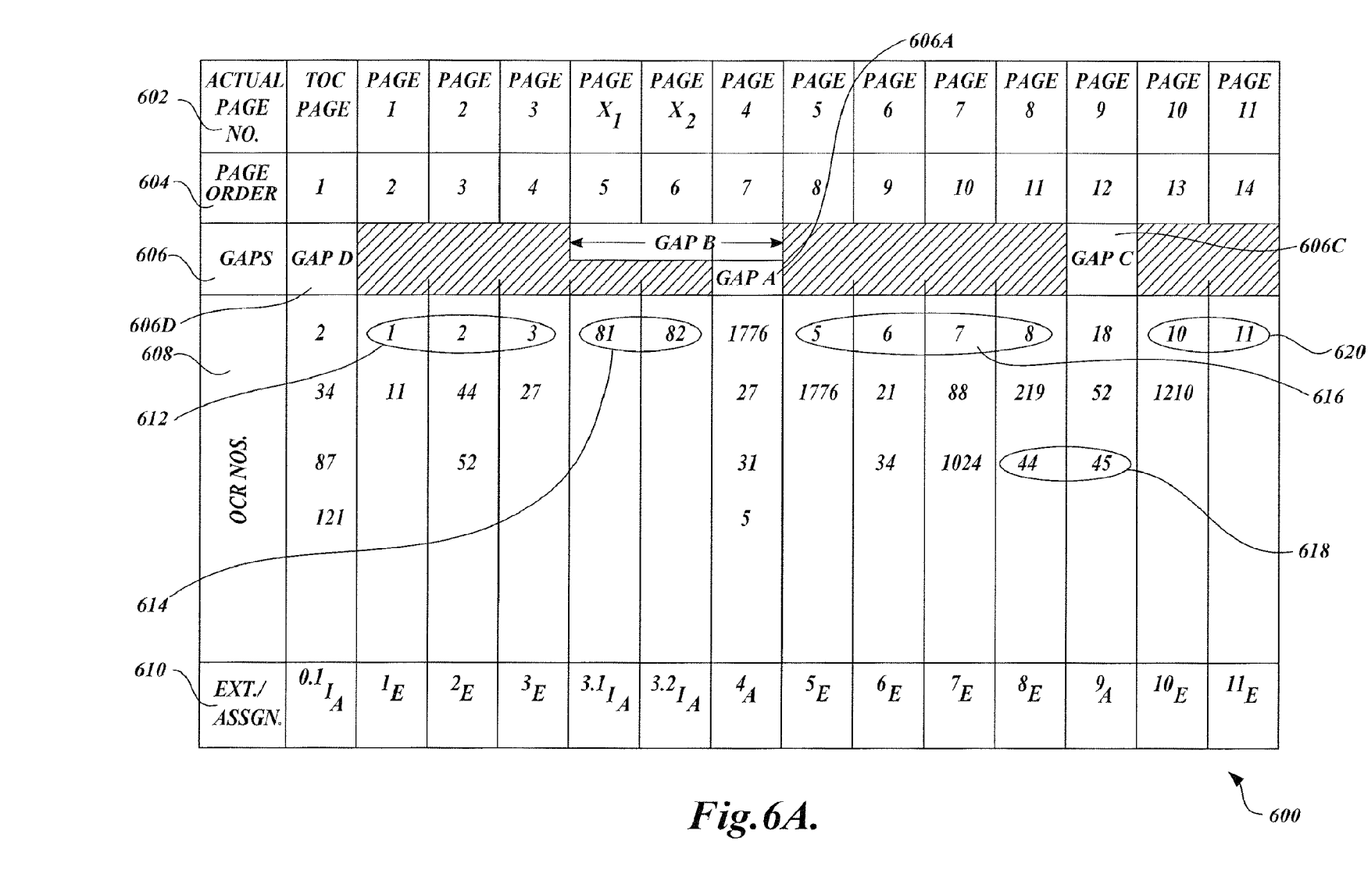
FIGS. 6A and 6B depict an example scenario of numbering images of pages in accordance with an embodiment of the present invention.
Figure 6B:
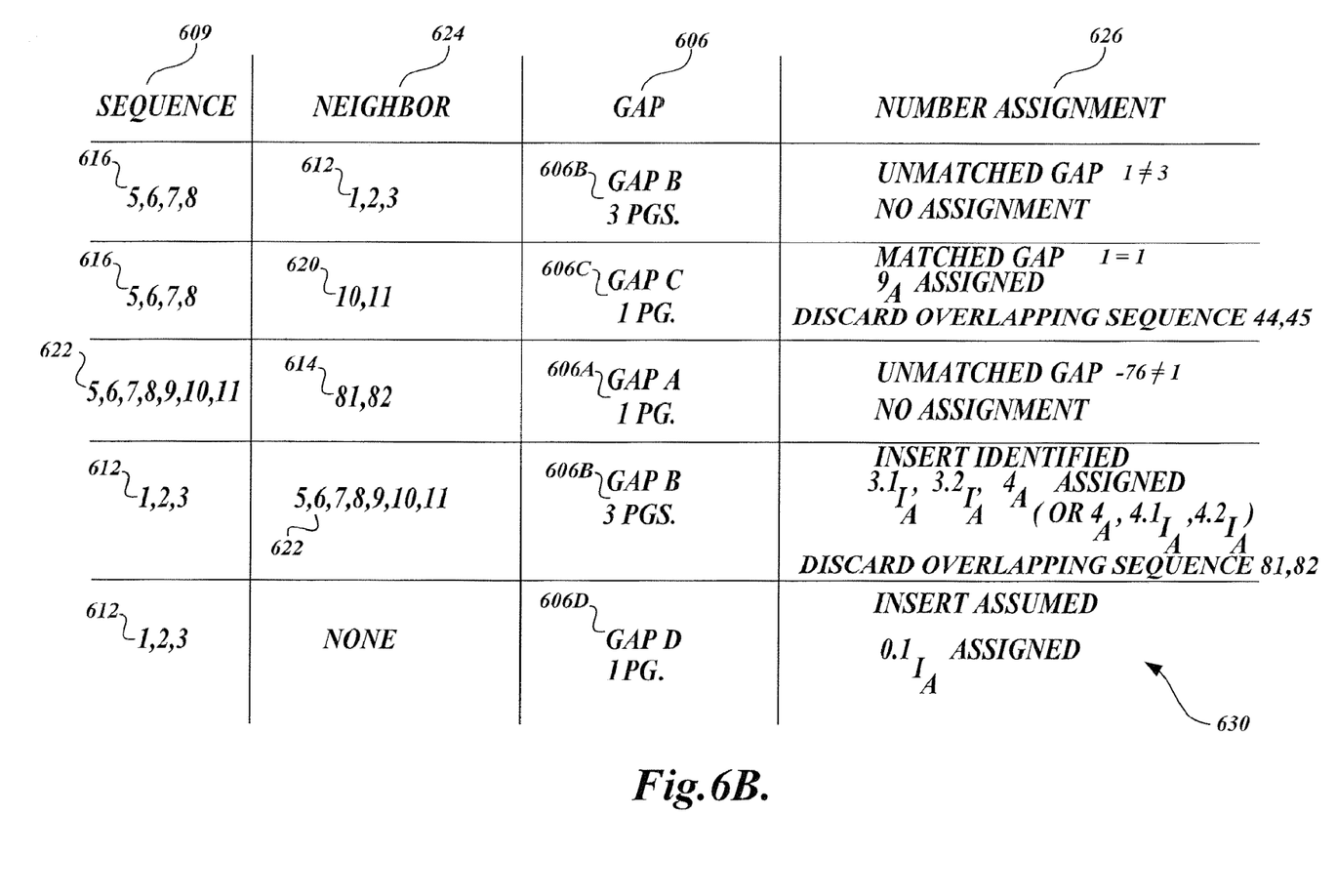

Turning now to FIGS. 6A and 6B, an example scenario of numbering images of pages is provided in accordance with an embodiment of the present invention. Specifically, FIG. 6A depicts a table 600 that summarizes the actual page number 602 of each page image obtained from a book, where the obtained page image is in a non-text-accessible format. Included in the summary table 600 is the page order 604 of the page images, the gaps 606 in page numbers extracted from or assigned to the page images, the OCR numbers 608 recognized from the obtained page images, and the extracted and assigned numbers 610 for the page images after the page numbering process has been completed in accordance with an embodiment of the present invention.

As shown in the table 600 under "TOC PAGE", there are four OCR numbers 608 recognized on the first page image, namely "2," "34," "87," and "121." None of these numbers appear to be a candidate page number since the subsequent page image ("PAGE 1") does not include any OCR numbers 608 that are one greater. Since the page is a Table of Contents type of page, the recognized numbers most likely represent numbers of other pages identified in the Table of Contents, or are simply numbers recognized in error by the character recognition process that was applied to the page image. Similarly, two OCR numbers 608 are recognized on the second page, namely "1" and "11," three numbers on the third page, namely "2," "44," and "52," two numbers on the fourth page, namely "3," and "27," one number on each of the next two pages, namely "81," and "82" respectively, four numbers on the seventh page, namely "1776," "27," "31," and "5," two numbers on the eighth page, namely "5," and "1776," three numbers on the ninth page, namely "6," "21," and "34," three numbers on the tenth page, namely "7," "88," "1024," three numbers on the eleventh page, namely "8," 219," and "44," three numbers on the twelfth page, namely "18, "52," "45," two numbers on the thirteenth page, namely "10," and "1210," and one number on the fourteenth and last page, namely "11."

During the page numbering process, five sequences are initially generated, including a sequence 612 containing extracted numbers "$1_E$," "$2_E$," and "$3_E$" spanning the second through fourth pages, a sequence 614 containing extracted numbers "$81_E$," and "$82_E$," spanning the fifth and sixth pages, a sequence 616 containing extracted numbers "$5_E$," "$6_E$," "$7_E$," and "$8_E$," spanning the eighth through eleventh pages, an overlapping sequence 618 containing extracted numbers "$44_E$," and "$45_E$," spanning the eleventh and twelfth pages, and a sequence 620 containing extracted numbers "$10_E$," and "$11_E$," spanning the thirteenth and fourteenth pages. The subscript "E," as used herein, is not necessarily part of the page number of a page image, but is included herein merely to conveniently identify page numbers that are extracted from a page image. Similarly, subscripts "A" and "I" are used herein merely to conveniently identify page numbers that are assigned to a page image or are page numbers for a page image insert, respectively.

As depicted in FIG. 6A, there are four gaps 606 between the sequences initially generated in the page numbering process. The gaps include Gap A 606A spanning the seventh page (actual Page 4), an overlapping Gap B 606B spanning the fifth through seventh pages (actual Inserts X1 and X2, and Page 4), Gap C 606C spanning the twelfth page (actual Page 9), and Gap D 606D spanning the first page (the Table of Contents page).

The bottom row of the table 600 depicts the numbers 610 that are extracted and assigned during the page numbering process, the details of which are further depicted in a second table 630 in FIG. 6B. The second table 630 identifies the sequence 609 being processed, the neighboring sequence 624 to which the sequence 609 is being compared, the gap 606 between the compared sequences, and an explanation of the number assignment determination 626. During the page numbering process, the longest sequence, sequence 616 containing extracted numbers "$5_E$," "$6_E$," "$7_E$," and "$8_E$" is first compared to neighboring sequence 612 containing extracted numbers "$1_E$," "$2_E$," and "$3_E$." Since the intervening gap, Gap B 606B, spanning three (3) pages does not exactly equal the number of missing page numbers, in this case one (1) missing page number "4," the gap is considered unmatched and no assignment of page numbers is made, at least at this time.

The longest sequence 616 containing extracted numbers "$5_E$," "$6_E$," "$7_E$," and "$8_E$" is then compared to another neighboring sequence 620 containing extracted numbers "$10_E$," and "$11_E$." The intervening gap, Gap C 606C, spanning a single page, does exactly equal the number of missing page numbers, in this case one (1) missing page number, so the missing page number "$9_A$" is assigned to the page image in the gap, and the sequences are joined into one longer sequence 622 containing extracted and assigned numbers "$5_E$," "$6_E$," "$7_E$," "$8_E$," "$9_A$," "$10_E$," and "$11_E$." In addition, since the overlapping sequence 618 containing numbers "$44_E$," and "$45_E$," spans some of the same pages that are spanned by the newly joined sequence 622, the overlapping sequence 618 is discarded as it is no longer needed to determine page numbering.

The now-longest sequence 622 containing extracted and assigned numbers "$5_E$," "$6_E$," "$7_E$," "$8_E$," "$9_A$," "$10_E$," and "$H_E$" is then compared to another neighboring sequence 614 containing extracted numbers "$81_E$," and "$82_E$." The intervening gap, Gap A 606A, spanning a single page, does not equal the number of apparent (and erroneous) missing page numbers, in this case seventy-six (76) apparent missing page numbers, so the gap is considered unmatched and no assignment of page numbers is made, at least at this time.

Now, the second longest sequence 612 containing extracted numbers "$1_E$," "$2_E$," and "$3_E$," is compared to the neighboring sequence 622, the newly joined sequence formed by joining sequences 616 and 620. (Note, the adjacent sequence 614 containing extracted numbers "$81_E$," and "$82_E$," is not eligible for comparison since there is no intervening gap between sequence 612 and sequence 614.) The intervening gap between sequence 612 and sequence 622 is the previously unmatched Gap B 606B spanning three (3) pages. Since the difference between the apparent number of missing pages, one (1), and the number of pages in Gap C is substantially small, i.e., just two (2) pages, the extra pages spanned by the gap are identified as an insert. Accordingly, the page numbering process assigns the missing page number to a page in the gap (which may be an arbitrary assignment), and assumes that the other pages in the gap are inserted pages. In the illustrated example, the seventh page spanned by Gap A 606A is assigned the missing page number, number "$4_A$," and the fifth and sixth pages spanned by Gap B 606B are assigned generated insert page numbers, shown here as numbers "$3.1_{IA}$," and "$3.2_{IA}$." In addition, since the adjacent sequence 614, containing numbers "$81_E$," and "$82_E$," spans some of the same pages that are spanned by the now-joined sequences 612 and 622, the adjacent sequence 614 is discarded as it is no longer needed to determine page numbering.

Since there is one more page to be accounted for, namely the page in Gap D 606D, in this example the Table of Contents page, the page numbering process attempts to assign a page number after determining that a sufficiently large number of page numbers have been determined and associated with page images (either as extracted or assigned page numbers) through the above-described page numbering process. In this case, the page image in Gap D 606D is assumed to be some type of insert, and an arbitrary page number of "$0.1_{IA}$" is assigned to the page image.

In summary, the actual page numbers 602 appearing in the top row of the table 600 in FIG. 6A, and the extracted and assigned numbers appearing in the bottom row of the table illustrate that the actual and extracted and assigned numbers are in agreement. In some cases, the page numbers assigned to pages of an insert may vary from the actual page numbers due to the difficulty of determining exactly which pages represent the insert and which pages represent numbered pages. However, the majority of the page numbering will agree with the actual page numbers.

Figure 7A:
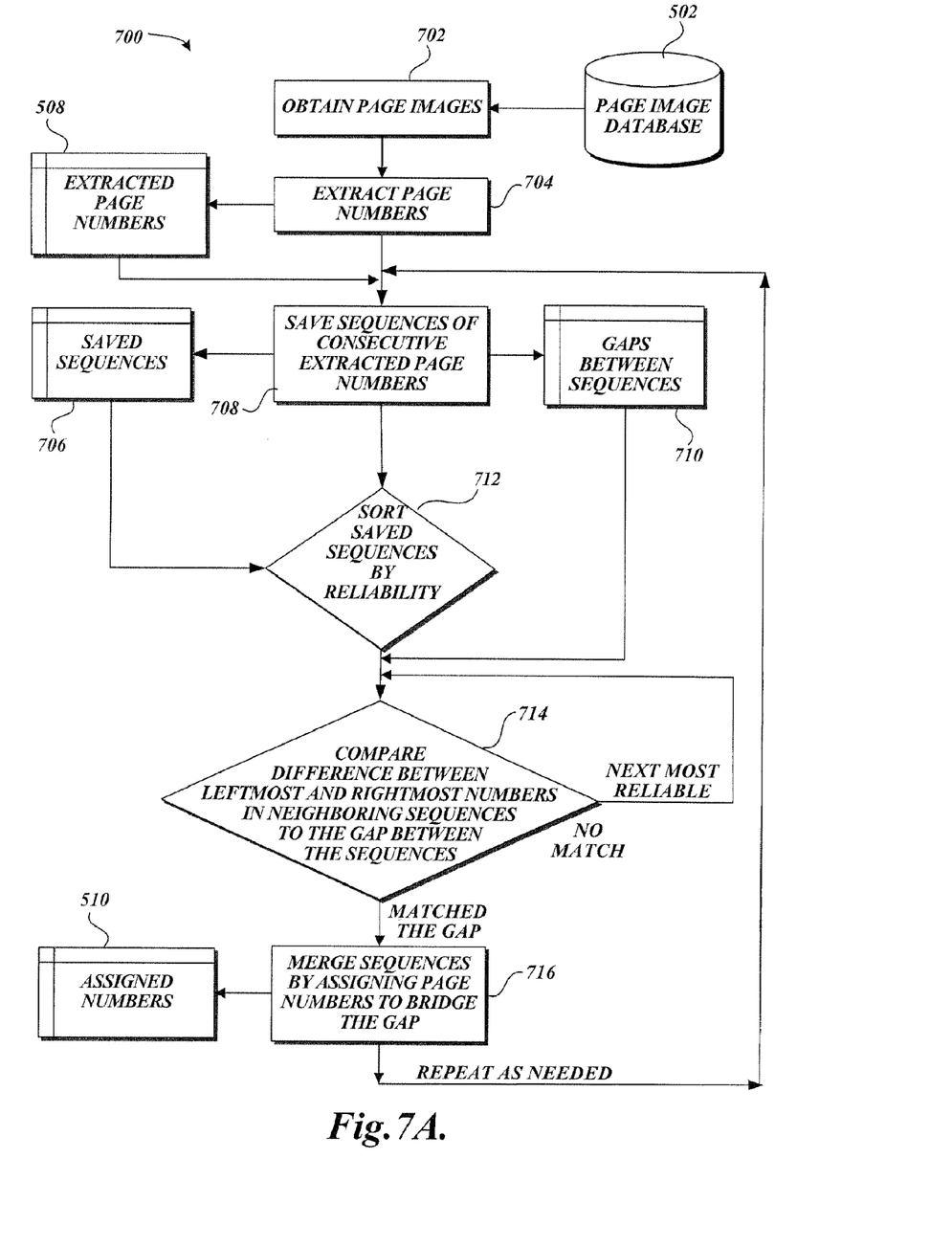
FIGS. 7A and 7B are flow diagrams of an exemplary method for determining page numbers of page images according to one embodiment of the present invention.
Figure 7B:
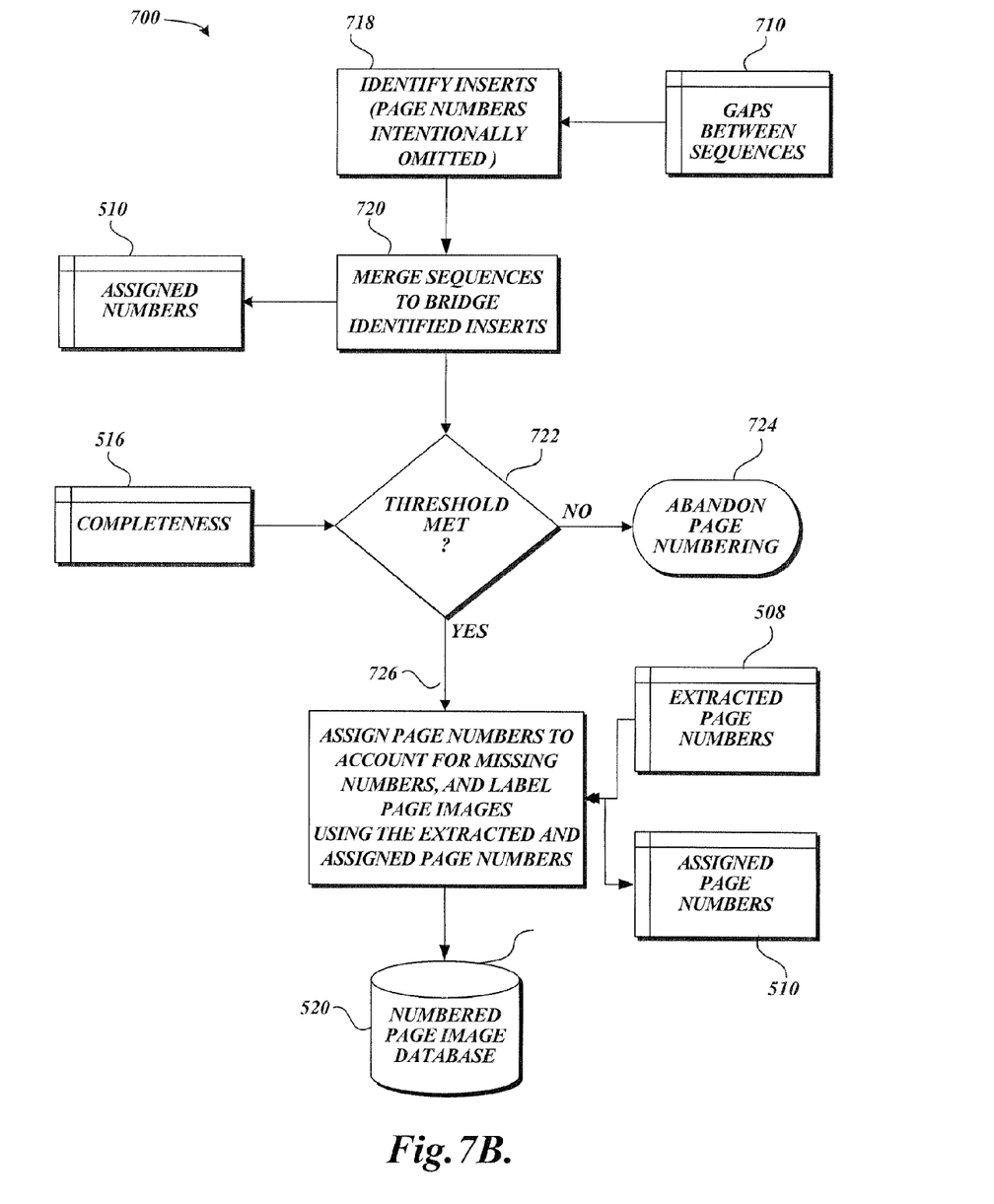

FIGS. 7A and 7B are flow diagrams of an exemplary method 700 for determining page numbers of page images according to one embodiment of the present invention. Many of the actions undertaken in the method 700 are evident from the example scenario given above in FIGS. 6A and 6B. At process block 702, the method 700 obtains page images from the page image database 502, and continues at process block 704 to extract candidate page numbers from those images into an extracted page numbers data structure 508. In one embodiment, the numbers are extracted from among the available numbers recognized as the result of performing a character recognition process on the page image. Candidate page numbers are defined as those numbers that are exactly one different than a number that was extracted from an adjacent page. In some instances, there are no candidate page numbers that can be extracted from the page. This may occur, for instance, where the quality of the character recognition performed on the page image is poor, resulting in an erroneous number, e.g., "21" instead of "2," or in no number at all, such as when a number is erroneously recognized as a non-numeric character or not at all. Of course, in some instances, the character recognition process is not to blame, such as where a page number has been intentionally omitted from a page, referred to herein as an insert. In some cases, there will be more than one number that may be a candidate for the page number, as where there are two series of consecutive numbers appearing in adjacent or overlapping pages. Only one of the numbers extracted from the page can be the actual page number, of course, but both numbers are extracted and sequences saved so that the method may determine which one of the numbers/sequences is more likely to be correct.

At processing block 708, the method 700 saves the extracted page numbers 508 as sequences in a saved sequence data structure 706, where each sequence is comprised of consecutive numbers, each number higher than the next number by an increment of one. Representations of any gaps between the sequences are also saved in a gap between sequence data structure 710. For example, in one embodiment, the method 700 saves generated sequence numbers that represent the order of the pages as they appear in the book, including pages falling within the gaps.

At sorting block 712, the method 700 sorts the saved sequences in order by the length of the sequence. For example, a longer uninterrupted sequence of numbers "11 12 13 14 15" representing the extracted page numbers of five pages of a book is sorted before a shorter uninterrupted sequence of numbers "1 2 3 4" representing four other pages of the book. The longer sequence is assumed to be more reliable, and so is processed before other shorter sequences. In one embodiment, instead of or in addition to sorting by length, the method 700 otherwise ranks the sequences in order of reliability, and process the most reliable sequences first. This might include ranking the sequences in order by an indication of reliability, such as a page type that indicates the type of page that the page image represents, e.g. Table of Contents page, first numbered page, chapter heading page, etc. The indication of reliability may be an indicator that is provided manually or automatically along with the page images during the process of capturing the image of each page or performing character recognition on the image.

In one embodiment, at comparison block 714, the method 700 determines whether two neighboring sequences match the gap in page numbers between the sequences by comparing the difference between the highest (rightmost) and lowest (leftmost) numbers in the sequences to the number of page images in the relevant gap 710. If the difference matches the gap 710, then at process block 716, the method 700 merges the two neighboring sequences by labeling the page images in the gap with the consecutive page numbers 510 necessary to bridge the gap. For example, if the example sequences numbers "11 12 13 14 15" and "1 2 3 4" above were compared, the difference is 6. If the number of pages in the gap between these sequences is also 6, there is a high likelihood that labeling the pages in the gap with the six numbers "5 6 7 8 9

10" will accurately represent the actual page numbers of those pages and thus bridge the gap.

At comparison block 714, if there is no exact match (e.g., if the number of pages in the gap in the above example were 4 instead of 6), then the merging process in block 716 is not performed, and the comparison process at block 714 is repeated for the next sequence in the sorted order. The process of comparing 714 and merging 716 the sequences continues until all possible sequences have been merged into larger sequences using assigned numbers 510.

The method 700 continues in FIG. 7B at processing block 718, where the method identifies whether some of the gaps 710 are actually inserts for which no page number was originally assigned, e.g., pages where the page numbers have been intentionally omitted. The determination of whether pages in a gap represent an insert is accomplished by comparing the differences between merged sequences resulting from process block 716 to the number of pages in the relevant gap. If the difference between the compared merged sequences and the number of pages in the gap is substantially small, e.g., just one or two pages, the pages in the gap are determined to be an insert. At process block 720, the method 700 merges the compared sequences to bridge the gap by labeling at least as many of the unnumbered page images in the gap to make up the substantially small difference. In one embodiment, at process block 720, the method 700 may assign or otherwise designate additional insert numbers with which to label the remaining page images in the insert such as the fractional numbers shown in the example scenario of FIGS. 6A and 6B. In some cases, this may result in some of the inserted pages being labeled with an assigned page number in error, but the likelihood of that happening is relatively small.

At comparison block 722, the method 700 continues processing by interrogating the completeness threshold 516 to determine whether the threshold has been met. The completeness threshold 516 may be any minimum number of pages or percentage of pages for which page numbers must have been recognized and/or assigned, below which number the accuracy of the automatic page numbering process is thrown into doubt. If the completeness threshold 516 has not been met, then further page numbering is abandoned 724. Otherwise, processing continues at processing block 726, where the method processes the remaining page images that have yet to be labeled with a page number using the merging processes described above. The resulting numbered pages are saved to the numbered page image database 520.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-implemented method for numbering page images, the method comprising:
   obtaining images of pages of content in a document in an order in which the pages appear in the document;
   extracting candidate page numbers from the content of the page images;
   saving extracted candidate page numbers in a plurality of sequences of numbers wherein for each sequence a candidate page number extracted from a page image is one different than a candidate page number extracted from an adjacent page image in the order in which the pages appear in the document;
   merging a first sequence and a second sequence of the plurality of sequences beginning with a more reliable sequence, wherein merging includes comparing the first sequence with the second sequence to determine whether a difference between a highest candidate page number in the first sequence and the lowest candidate page number in the second sequence matches a number of page images spanned by a gap between the first and the second sequences, and if so, assigning consecutive page numbers to the page images in the gap;
   determining whether to abandon numbering of page images based on a variable completeness threshold determined based on a method of extracting candidate page numbers; and
   labeling the page images in accordance with the extracted and assigned page numbers in the merged sequence.

2. The method of claim 1, wherein extracting candidate page numbers from the content of the page images includes recognizing numbers appearing in the content of the page images using a character recognition process.

3. The method of claim 1, wherein extracting candidate page numbers from the content of the page images includes extracting numbers from content represented in a text-accessible format.

4. The method of claim 1, wherein the gap between the first and second sequences spans one or more page images from which no numbers could be extracted.

5. The method of claim 1, wherein the gap between the first and second sequences spans one or more page images from which an extracted number was not saved in a sequence because the number was not one different than a number extracted from an adjacent page image.

6. The method of claim 1, further comprising assigning consecutive page numbers to the page images spanned by any unmatched gaps between the merged sequences after determining that the number of page images in the merged sequences meets the variable completeness threshold.

7. The method of claim 1, further comprising:
   determining whether page images spanned by an unmatched gap between merged sequences represent an insert; and
   assigning insert page numbers to the page images spanned by the unmatched gap.

8. The method of claim 7, wherein determining whether the page images spanned by an unmatched gap represent an insert includes determining whether a difference between the highest candidate page number in a merged sequence and the lowest candidate page number in another sequence is substantially small.

9. The method of claim 7, wherein the insert page numbers include one or more consecutive page numbers or fractional page numbers.

10. The method of claim 1, further comprising abandoning numbering of page images when the variable completeness threshold has not been met.

11. The method of claim 1, wherein the variable completeness threshold is a minimum number of page images from which page numbers must be extracted.

12. The method of claim 1, wherein the variable completeness threshold is a minimum number of page images for which page numbers must be determined from merging sequences of extracted page numbers.

13. The method of claim 1, wherein the variable completeness threshold is a percentage of the total number of pages in the document.

14. The method of claim 1, further comprising discarding shorter sequences spanning the same page images as a longer sequence.

15. The method of claim 1, wherein the variable completeness threshold is determined based on a type of the document.

16. The method of claim 1, wherein the variable completeness threshold is determined based on a quality of the images of pages of content in the document.

17. The method of claim 2, wherein the variable completeness threshold is determined based on a technology used in the character recognition process.

18. A computer-implemented system to facilitate numbering images of pages of a document, comprising:
 a page image database operable to store page images organized according to an order in which pages appear in the document;
 a memory operable to store candidate page numbers extracted from the page images;
 a sequence merger component, coupled with the memory and the page image database, operable to merge two sequences of extracted candidate page numbers when a beginning candidate page number of a first sequence and an ending candidate page number of a second sequence differ by an amount that equals a number of page images in a gap between the first sequence and second sequence;
 an insert identifier component, coupled with the sequence merger component, operable to identify omitted page numbers forming the gap between the first sequence and second sequence;
 an assignment component, coupled with the insert identifier component, operable to assign consecutive page numbers to page images spanned by the gap, and labeling the page images in accordance with the extracted and assigned page numbers; and
 a completion threshold component, coupled with the assignment component, operable to determine and apply a completeness threshold to determine whether to abandon the numbering of page images.

19. The system of claim 18, wherein the sequence merger component merges sequences having a greater likelihood of containing extracted numbers that represent actual page numbers of the page images before merging sequences having a lesser likelihood of containing extracted numbers that represent actual page numbers of the page images.

20. The system of claim 19, wherein the sequence merger component is further operable to sort sequences from longest to shortest and merge longer sequences before shorter sequences, wherein longer sequences have a greater likelihood of containing extracted numbers that represent actual page numbers than shorter sequences.

21. The system of claim 18, wherein the memory operable to store extracted numbers further includes memory in which to store the completeness threshold.

22. The system of claim 18, wherein the completeness threshold is a minimum number of occurrences of extracted numbers that have been determined to have a greater likelihood of representing actual page numbers.

23. The system of claim 18, wherein the completeness threshold is a minimum number of page images that have been numbered in accordance with the extracted and assigned page numbers.

24. The system of claim 18, wherein the completeness threshold is expressed as a percentage of the total number of pages in the document.

25. The system of claim 18, wherein the completeness threshold is determined based on a type of the document.

26. The system of claim 18, wherein the completeness threshold is determined based on a quality of the images of pages of content in the document.

27. A non-transitory computer-readable medium having encoded thereon instructions to number images of pages of a document, wherein the instructions, when executed by a computing apparatus, cause the computing apparatus to:
 obtain images of pages in an order in which the pages occur in a document;
 extract a number from at least one of the page images when the number is one different than a number extracted from an image of an adjacent page in the order in which the page occurs in the document;
 store the extracted numbers as sequences of consecutive numbers that correspond to the order in which the pages occur in the document;
 assign missing numbers to fill in gaps between the sequences when a count of the pages represented by a gap matches a count of the missing numbers that are needed to fill the gap;
 assign missing numbers to partially fill in gaps between the sequences when a count of the pages represented by the gap does not match the count of the missing numbers that are needed to fill in the gap, but differs by a substantially small amount;
 determine whether to abandon numbering of page images based on a variable completeness threshold; and
 label the page images with the extracted and assigned numbers.

28. The computer-readable medium of claim 27, wherein the instructions further cause the computing apparatus to rank the sequences of consecutive numbers in order of reliability, where reliability is determined from an indication that the extracted numbers in the sequence are likely to match the actual page number of the page from which the image was obtained, and wherein the instructions to assign missing numbers to fill in the gaps between the sequences are performed in order of reliability.

29. The computer-readable medium of claim 28, wherein the indication that the extracted numbers are likely to match the actual page number of the page from which the image was obtained is determined based upon a length of the sequence, where the longer the sequence of consecutive numbers the greater the reliability.

30. The computer-readable medium of claim 29, wherein the instructions further cause the computing apparatus to discard smaller sequences that conflict with longer sequences.

31. The computer-readable medium of claim 27, wherein the substantially small amount is an integer of less than or equal to three.

32. The computer-readable medium of claim 27, wherein the instructions that cause the computing apparatus to assign missing numbers to partially fill in gaps between the sequences includes an instruction to choose which of the pages represented by the gap are assigned the missing numbers, and to assign an insert designation to the unassigned pages.

33. The computer-readable medium of claim 32, wherein the choice is arbitrary.

34. The computer-readable medium of claim 32, wherein the choice is made according to at least one of a type of document from which the image was obtained and a characteristic of the insert, the characteristic including at least one of a number of pages represented by the gap, a type of pages represented by the gap, and whether a page immediately adjacent to the gap is labeled with an extracted number or an assigned number.

35. The computer-readable medium of claim 28, wherein the indication that the extracted numbers are likely to match the actual page number of the page from which the image was obtained is a page type of the pages represented by the sequence, where a pre-determined page type indicates a greater reliability.

* * * * *